US012681351B2

(12) United States Patent
Tseng et al.

(10) Patent No.: US 12,681,351 B2
(45) Date of Patent: Jul. 14, 2026

(54) ELECTRONIC DEVICE

(71) Applicant: InnoLux Corporation, Miao-Li County (TW)

(72) Inventors: Yu-Chih Tseng, Miao-Li County (TW); Yi Tung, Miao-Li County (TW); Pi-Ying Chuang, Miao-Li County (TW); Yu-Tong Kuo, Miao-Li County (TW); Chu-Hong Lai, Miao-Li County (TW); Cheng-Jen Chu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/910,706

(22) Filed: Oct. 9, 2024

(65) Prior Publication Data

US 2025/0147366 A1 May 8, 2025

(30) Foreign Application Priority Data

Nov. 6, 2023 (CN) .......................... 202311462686.1

(51) Int. Cl.
 *G02F 1/1345* (2006.01)
 *G02F 1/1335* (2006.01)
 *G02F 1/1347* (2006.01)
(52) U.S. Cl.
 CPC .... *G02F 1/13452* (2013.01); *G02F 1/133531* (2021.01); *G02F 1/1347* (2013.01)

(58) Field of Classification Search
 CPC ........... G02F 1/13452; G02F 1/133531; G02F 1/1347
 See application file for complete search history.

(56) References Cited

U.S. PATENT DOCUMENTS

| | | | | |
|---|---|---|---|---|
| 6,697,131 B2 * | 2/2004 | Takami | ............... | G02F 1/13473 |
| | | | | 349/149 |
| 2019/0129225 A1 * | 5/2019 | Lee | ................... | G02F 1/133514 |
| 2022/0113576 A1 * | 4/2022 | Kanesaka | ........... | G02F 1/13471 |

FOREIGN PATENT DOCUMENTS

TW       201917464 A       5/2019

* cited by examiner

*Primary Examiner* — Nathanael R Briggs
(74) *Attorney, Agent, or Firm* — MUNCY, GEISSLER, OLDS & LOWE, P.C.

(57) ABSTRACT

An electronic device includes: a first panel including a first bonding pad and a first edge adjacent to the first bonding pad; a second panel overlapped with the first panel and including a second bonding pad; a circuit board electrically connected to the first panel and used to provide a first signal; and a first conductive connector electrically connected to the first panel and the second panel, wherein the first signal is input to the first bonding pad of the first panel through the circuit board, and input to the second bonding pad of the second panel through the first conductive connector, wherein the first bonding pad is between the second bonding pad and the first edge in a top view direction.

20 Claims, 11 Drawing Sheets

ELECTRONIC DEVICE

CROSS-REFERENCE TO RELATED APPLICATIONS

This application claims the benefits of the Chinese Patent Application Ser. No. 202311462686.1, filed on Nov. 6, 2023, the subject matter of which is incorporated herein by reference.

BACKGROUND

Field

The present disclosure is related to an electronic device and, more specifically to an electronic device comprising multiple panels.

Description of Related Art

With the advancement of electronic device technology, most of today's electronic products are pursuing thinness, lightness, and compactness, or are developing in the direction of high integration, that is, a single electronic device can have multiple functions, such as display, touch, privacy and other functions. It is known that the light transmittance of an electronic device can be adjusted by overlapping multiple panels to achieve effects such as privacy.

However, when multiple panels are overlapped, the circuits provided in the non-display area are easy to interfere with each other, which may cause panel failure in severe cases, thus affecting the process yield. In addition, using substrates with different thicknesses to reduce the overall device thickness can easily lead to collapse due to lack of support of the substrate, leading to defects such as short circuits.

Therefore, it is desirable to provide an electronic device to improve the aforesaid defects.

SUMMARY

The present disclosure provides an electronic device, which comprises: a first panel comprising a first bonding pad and a first edge adjacent to the first bonding pad; a second panel overlapped with the first panel and comprising a second bonding pad; a circuit board electrically connected to the first panel and used to provide a first signal; and a first conductive connector electrically connected to the first panel and the second panel, wherein the first signal is input to the first bonding pad of the first panel through the circuit board, and input to the second bonding pad of the second panel through the first conductive connector, wherein the first bonding pad is between the second bonding pad and the first edge in a top view direction.

The present disclosure further provides an electronic device, which comprises: a first panel comprising a first bonding pad; a second panel overlapped with the first panel and comprising a second bonding pad; a circuit board electrically connected to the first panel and used to provide a first signal; and a first conductive connector electrically connected to the first panel and the second panel, wherein the first signal is input to the first bonding pad of the first panel through the circuit board, and input to the second bonding pad of the second panel through the first conductive connector, wherein a resistance of the circuit board is different from a resistance of the first conductive connector.

Other novel features of the disclosure will become more apparent from the following detailed description when taken in conjunction with the accompanying drawings.

DETAILED DESCRIPTION

Figure 1:
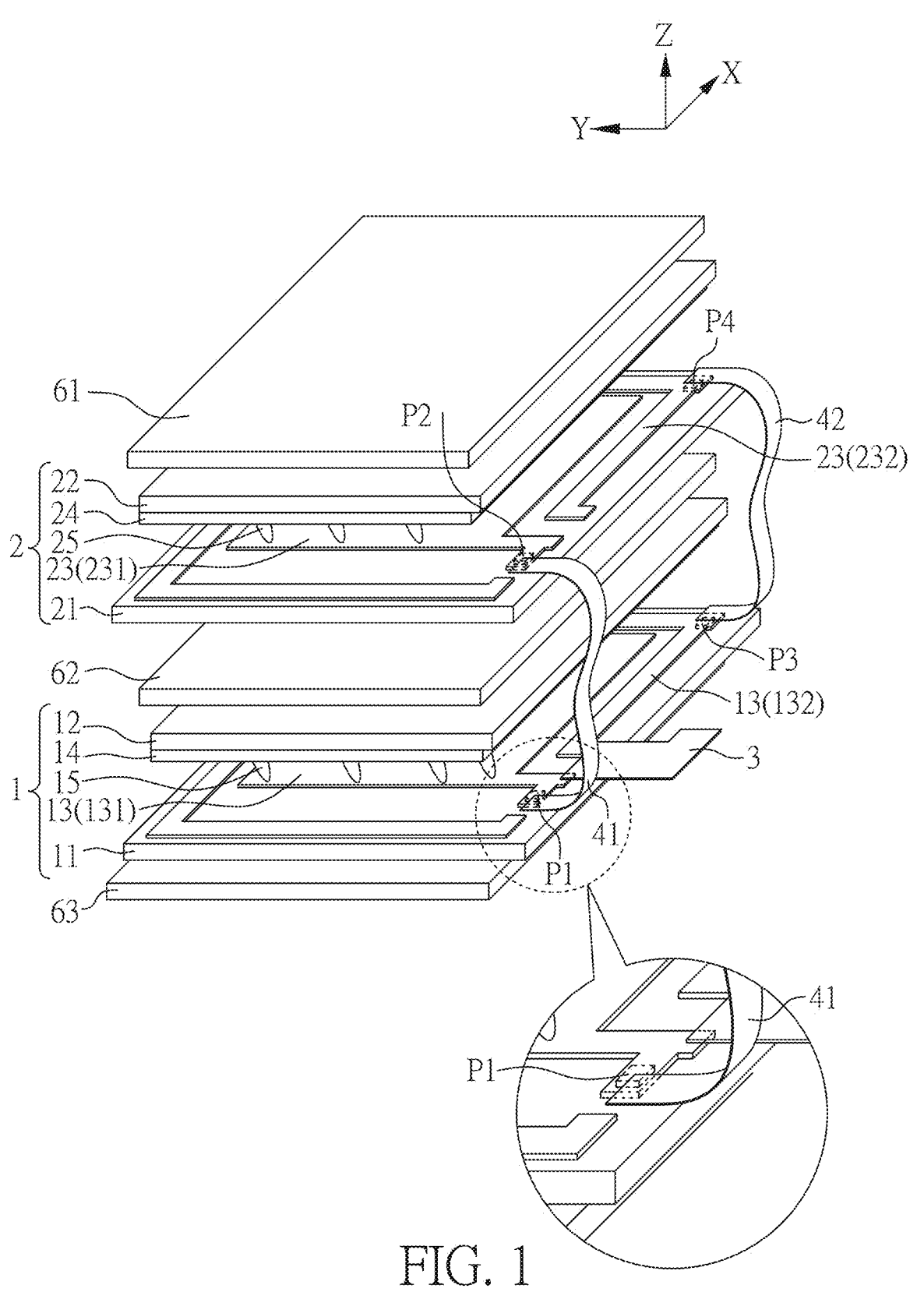
FIG. 1 is an explosion diagram showing an electronic device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified. Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names. In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms, such as "about", "substantially", or "approximately", are generally interpreted as within 10%, 5%, 3%, 2%, 1%, or 0.5% of a given value or range. The quantity given here is an approximate quantity, that is, without specifying "about", "approximately", "substantially" and "approximately", "about", "approximately", "substantially" and "approximately" can still be implied. Furthermore, when a value is "in a range from a first value to a second value" or "in a range between a first value and a second value", the value can be the first value, the second value, or another value between the first value and the second value.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

In the present disclosure, the distance, the length, the width and the thickness may be measured using an optical microscope or using cross-sectional images in an electron microscope, but the present disclosure is not limited thereto. In the present disclosure, the resistance may be measured by using a three-purpose electric meter, a four-point probe, or other precision instruments. In addition, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°.

It should be noted that the technical solutions provided by different embodiments hereinafter may be replaced, combined or used in combination, so as to constitute another embodiment without violating the spirit of the present disclosure.

Figure 2:
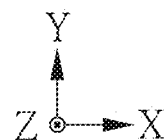
FIG. 2 is a schematic top view of FIG. 1.
Figure 2:
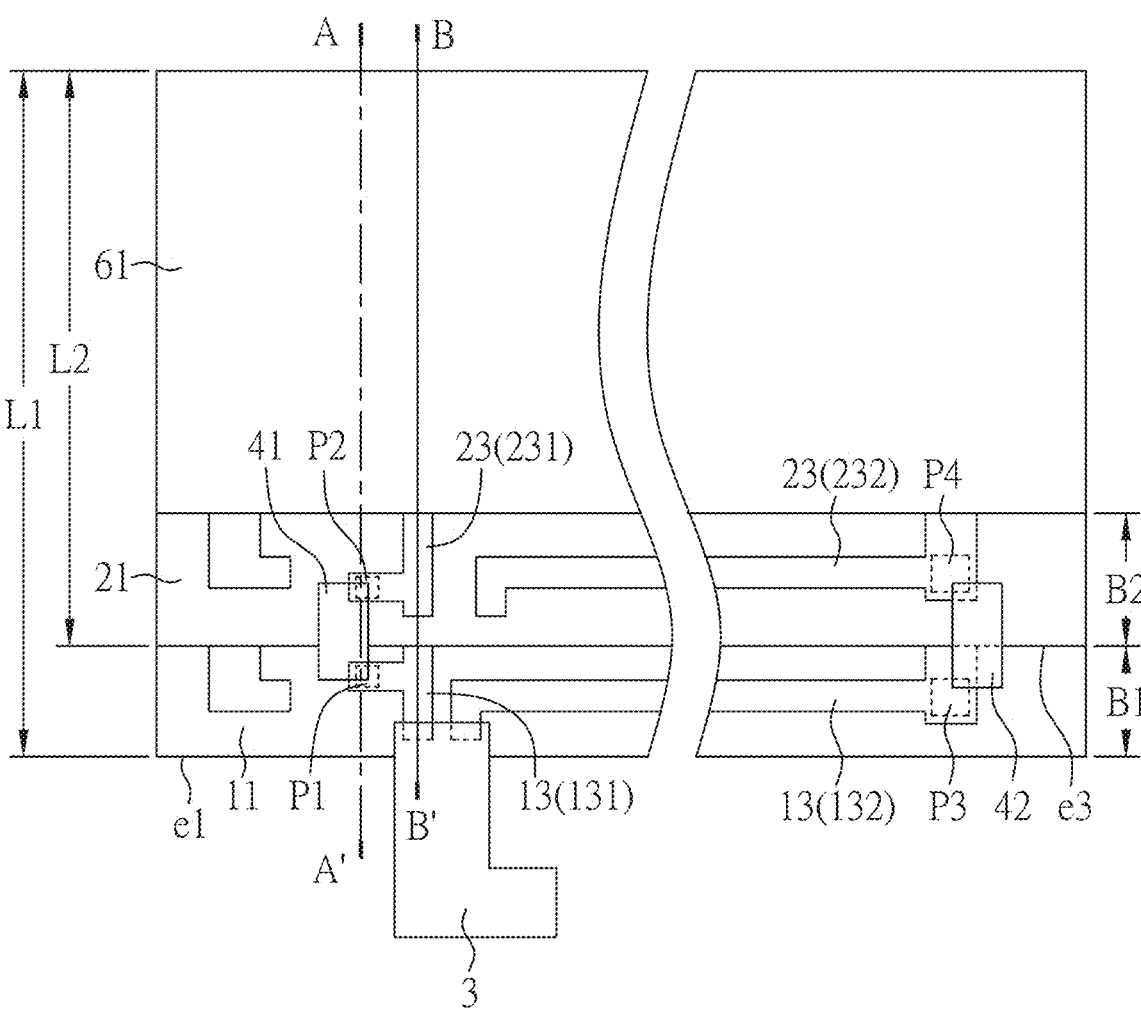
Figure 3A:
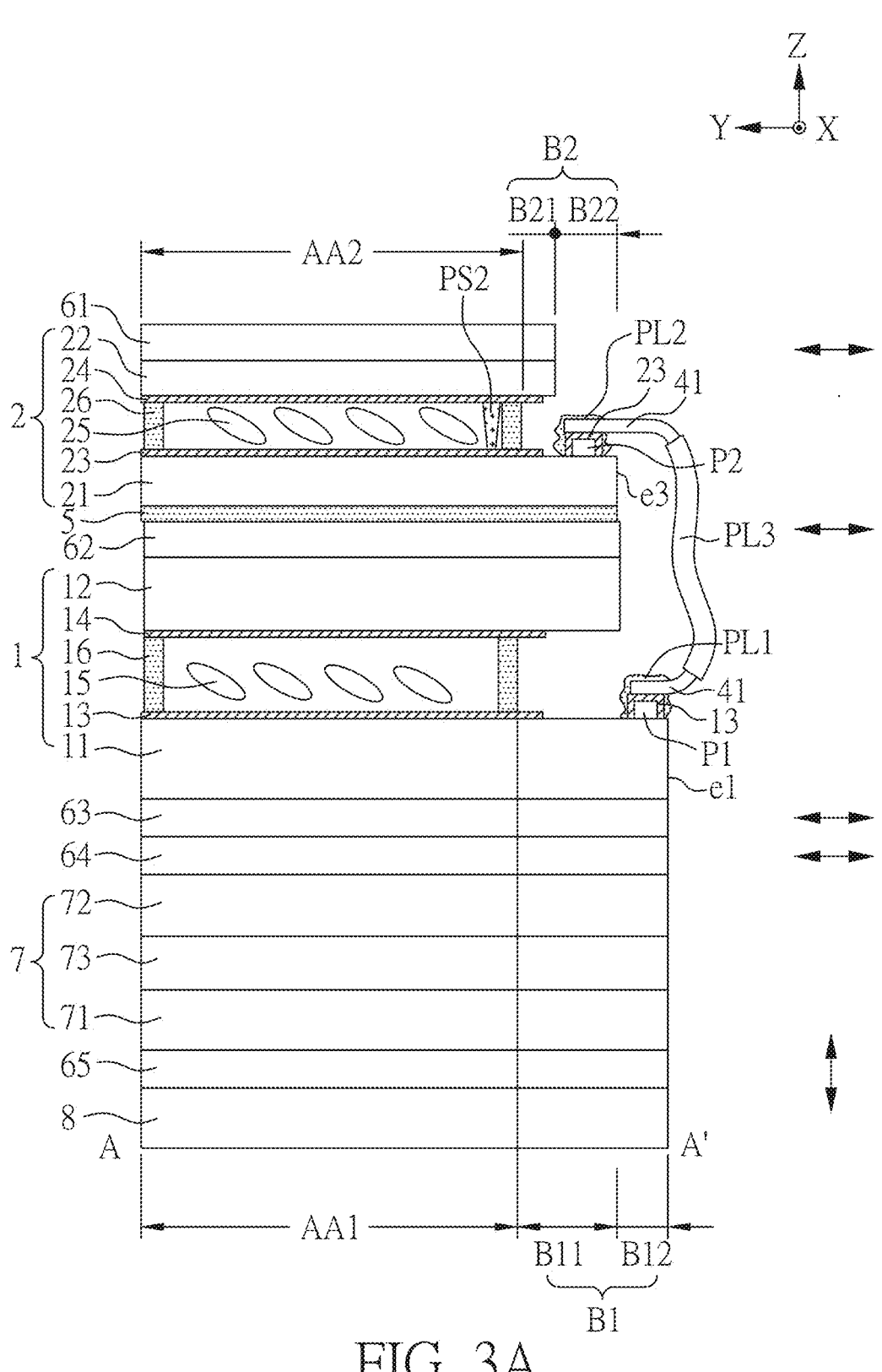
FIG. 3A is a schematic cross-sectional view of line segment A-A' in FIG. 2.
Figure 3B:
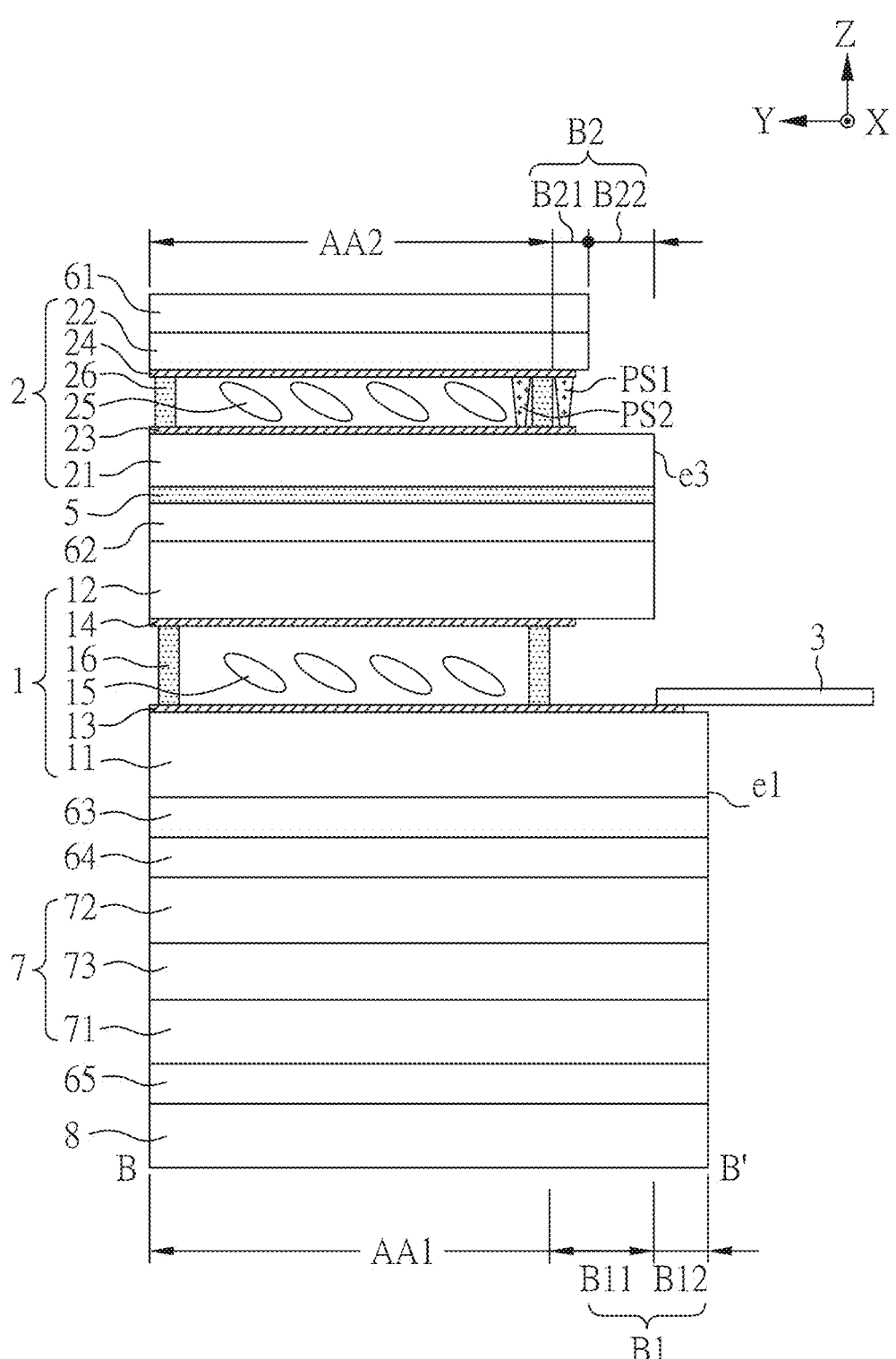
FIG. 3B is a schematic cross-sectional view of line segment B-B' in FIG. 2.

FIG. 1 is an explosion diagram showing an electronic device according to one embodiment of the present disclosure. FIG. 2 is a schematic top view of FIG. 1. FIG. 3A is a schematic cross-sectional view of line segment A-A' in FIG. 2. FIG. 3B is a schematic cross-sectional view of line segment B-B' in FIG. 2. For convenience of explanation, some components are omitted in FIG. 1.

In one embodiment of the present disclosure, as shown in FIG. 1 to FIG. 3A, the electronic device comprises: a first panel 1 comprising a first bonding pad P1 and a first edge e1 adjacent to the first bonding pad P1; a second panel 2 overlapped with the first panel 1 and comprising a second bonding pad P2; a circuit board 3 electrically connected to the first panel 1 and used to provide a first signal; and a first conductive connector 41 electrically connected to the first panel 1 and the second panel 2, wherein the first signal is input to the first bonding pad P1 of the first panel 1 through the circuit board 3 and input to the second bonding pad P2 of the second panel 2 through the first conductive connector 41. In the present disclosure, as shown in FIG. 2, the first bonding pad P1 is between the second bonding pad P2 and the first edge e1 in a top view direction Z of the electronic device. In the present disclosure, by setting the first conductive connector 41, signals can be input from one circuit board 3 to the first panel 1 and the second panel 2, thereby reducing the number of circuit boards installed, thereby reducing mutual interference between circuit boards, improving the reliability of the electronic device, saving costs, or simplifying the manufacturing process.

More specifically, as shown in FIG. 1, FIG. 3A and FIG. 3B, the first panel 1 may comprise: a first substrate 11; a second substrate 12 disposed opposite to the first substrate 11; a first conductive layer 13 disposed on the first substrate 11; a second conductive layer 14 disposed on the second substrate 12; a first light modulating layer 15 disposed between the first conductive layer 13 and the second conductive layer 14; and a first sealant 16 disposed between the first conductive layer 13 and the second conductive layer 14 and surrounds the first light modulating layer 15. The second panel 2 may comprise: a third substrate 21; a fourth substrate 22 disposed opposite to the third substrate 21; a third conductive layer 23 disposed on the third substrate 21; a fourth conductive layer 24 disposed on the fourth substrate 22; a second light modulating layer 25 disposed between the third conductive layer 23 and the fourth conductive layer 24; and a second sealant 26 disposed between the third conductive layer 23 and the fourth conductive layer 24 and surrounds the second light modulating layer 25. In the present disclosure, even not shown in the figure, the first panel 1 and the second panel 2 may comprise alignment layers respectively disposed on the first conductive layer 13, the second conductive layer 14, the third conductive layer 23 and the fourth conductive layer 24, and the alignment layers are disposed adjacent to the first light modulating layer 15 or the second light modulating layer 25. The first panel 1 and the second panel 2 may be viewing angle adjustable panels. The first light modulating layer 15 may be controlled by applying voltage to the first conductive layer 13 and the second conductive layer 14, or/and the second light modulating layer 25 may be controlled by applying voltage to the third conductive layer 23 and the fourth conductive layer 24. Therefore, the light transmittance of the first panel 1 and/or the second panel 2 can be adjusted so that the electronic device can achieve light transmission, shielding, or privacy functions, thereby achieving the privacy effect of the electronic device. In one embodiment of the present disclosure, the first panel 1 and the second panel 2, for example, may be respectively an electrical control birefringence (ECB) panel or a liquid crystal panel, but the present disclosure is not limited thereto. By controlling the voltage of the conductive layer, the first panel 1 and the second panel 2 may have a sharing mode and a privacy mode respectively, and the first panel 1 and the second panel 2 can respectively switch between the sharing mode and the privacy mode. The "privacy mode" refers to, for example, that the light transmittance is less than 10%, such as less than 8%, 6%, 5%, 4%, 3%, 2%, 1%, 0.5% or less, so that the image cannot be observed, or it can also mean that the image cannot be observed at some angles, for example, the image can be observed from the front view, but not from the side view.

In the present disclosure, as shown in FIG. 2, the third substrate 21 has a third edge e3, and the first edge e1 and the third edge e3 are parallel to each other. Herein, in the top view direction Z of the electronic device, the first bonding pad P1 may be between the first edge e1 and the third edge e3.

In one embodiment of the present disclosure, as shown in FIG. 3A and FIG. 3B, the second substrate 12 may be disposed on the first substrate 11, and the second substrate 12 may be disposed between the first substrate 11 and the third substrate 21; the fourth substrate 22 may be disposed on the third substrate 21, and the third substrate 21 may be disposed between the second substrate 12 and the fourth substrate 22; but the present disclosure is not limited thereto.

In the present disclosure, as shown in FIG. 2 and FIG. 3A, in the top view direction Z of the electronic device, the first bonding pad P1 and part of the first conductive layer 13 are overlapped, the second bonding pad P2 and part of the third conductive layer 23 are overlapped, the first conductive connector 41 may be electrically connected to the first bonding pad P1 through the first conductive layer 13, and the first conductive connector 41 may be electrically connected to the second bonding pad P2 through the third conductive layer 23. In the present disclosure, as shown in FIG. 3A, the first substrate 11 comprises an active region AA1 and a peripheral region B1. In the cross-sectional view, the peripheral region B1 further comprises a shielding region B11 overlapping the second substrate 12 and an exposed region B12, the first bonding pad P1 is disposed in the exposed region B12 of the first substrate 11. The third substrate 21 comprises an active region AA2 and a peripheral region B2. In the cross-sectional view, the peripheral region B2 comprises a shielding region B21 and an exposed region B22 overlapping the fourth substrate 22. The second bonding pad P2 is disposed in the exposed region B22 of the third substrate 21. The "active region" refers to, for example, the region on the first substrate 11 surrounded by the first sealant 16, or for example, the region on the third substrate 21 surrounded by the second sealant 26. In addition, the "peripheral region" refers to, for example, the region on the first substrate 11 other than the active region AA1, or, for example, the region on the third substrate 21 other than the active region AA2.

In one embodiment of the present disclosure, as shown in FIG. 3A, the first conductive layer 13 may be disposed on the first bonding pad P1, but the present disclosure is not limited thereto. In other embodiments of the present disclosure, the first bonding pad P1 may be disposed on the first conductive layer 13. Similarly, in one embodiment of the present disclosure, the third conductive layer 23 may be disposed on the second bonding pad P2, but the present disclosure is not limited thereto. In other embodiments of the present disclosure, the second bonding pad P2 may be disposed on the third conductive layer 23. In one embodiment of the present disclosure, as shown in FIG. 3B, the circuit board 3 may be disposed on the first substrate 11. More specifically, the circuit board 3 may be disposed in the peripheral region B1 of the first substrate 11, and electrically connected to the first conductive layer 13. In other embodiments of the present disclosure, even not shown in the figure, the circuit board 3 may also be disposed on the third substrate 21 and electrically connected to the third conductive layer 23.

In one embodiment of the present disclosure, as shown in FIG. 2, the first panel 1 has a first length L1, the second panel 2 has a second length L2, and the first length L1 is different from the second length L2. More specifically, as shown in FIG. 2, in the top view direction Z of the electronic device, the first length L1 of the first panel 1 may be the length of the first substrate 11 along the Y direction, and the second length L2 of the second panel 2 may be the length of the third substrate 21 along the Y direction, but the present disclosure is not limited thereto. In one embodiment of the present disclosure, even not shown in the figure, in the top view direction Z of the electronic device, the length of the first panel 1 may be the length of the first substrate 11 along the X direction, and the length of the second panel 2 may be the length of the third substrate 21 along the X direction, wherein the length of the first panel 1 may be different from the length of the second panel 2. The "length of the panel" refers to the maximum dimension of the panel in one direction. In addition, in the present disclosure, as shown in FIG. 2, the first conductive connector 41 and the circuit board 3 may be disposed at the same side of the first panel 1. In other words, the first conductive connector 41 and the circuit board 3 are disposed adjacent to the first edge e1 of the first panel 1. In one embodiment of the present disclosure, the first edge e1 of the first panel 1 is the edge of the largest substrate in the first panel 1, for example, it is equivalent to the edge of the first substrate 11.

In one embodiment of the present disclosure, as shown in FIG. 3A and FIG. 3B, the second panel 2 may comprise a first supporting unit PS1 and a second supporting unit PS2, the first supporting unit PS1 and the second supporting unit PS2 are respectively disposed between the third conductive layer 23 and the fourth conductive layer 24, and the first supporting unit PS1 may be disposed outside the second sealant 26, for example, disposed in the shielding region B21 of the third substrate 21 in the cross-sectional view. In other words, in the cross-sectional view, the first supporting unit PS1 may be disposed between the third edge e3 and a side of the second sealant 26 adjacent to the third edge e3, so the occurrence of short circuits of the third conductive layer 23 and the fourth conductive layer 24 extending outside the second sealant 26 can be reduced. In addition, the second supporting unit PS2 may be disposed inside the second sealant 26. For example, in the cross-sectional view, the second supporting unit PS2 may be disposed in the region surrounding by the second sealant 26, so the distance between the third conductive layer 23 and the fourth conductive layer 24 in the second sealant 26 can be maintained. More specifically, along the Y-axis direction of the third substrate 21, compared with the second supporting unit PS2, the first supporting unit PS1 is disposed further away from the second light modulating layer 25 and closer to the third edge e3. The first supporting unit PS1 and the second supporting unit PS2 can maintain the distance between the third substrate 21 and the fourth substrate 22, reducing the short circuit between the third conductive layer 23 and the fourth conductive layer 24 caused by the collapse of the substrate, thereby improving the reliability of the electronic device. In one embodiment of the present disclosure, in the top view direction Z of the electronic device, at least part of the first supporting unit PS1 may be overlapped with the third conductive layer 23, and the second supporting unit PS2 may be overlapped with the third conductive layer 23. In addition, even not shown in the figure, in one embodiment of the present disclosure, the first panel 1 may also comprise the first supporting unit PS1 and the second supporting unit PS2 shown in the second panel 2, so a certain distance between the first substrate 11 and the second substrate 12 can be maintained to reduce the short circuit between the first conductive layer 13 and the second conductive layer 14 caused by the collapse of the substrate, thereby improving the reliability of the electronic device. The characteristics of the supporting units in the first panel 1 are as shown in the first supporting unit PS1 and the second supporting unit PS2 in the second panel 2, and are not be described again here.

In the present disclosure, the materials of the first substrate 11, the second substrate 12, the third substrate 21 and the fourth substrate 22 may be the same or different. The materials of the first substrate 11, the second substrate 12, the third substrate 21 and the fourth substrate 22 may respectively comprise glass, quartz, sapphire, ceramics, plastic, polycarbonate (PC), polyimide (PI), polypropylene (PP), polyethylene terephthalate (PET), polymethylmethacrylate (PMMA), other suitable materials or a combination thereof, but the present disclosure is not limited thereto. In the present disclosure, the thicknesses of the first substrate 11, the second substrate 12, the third substrate 21 and the fourth substrate 22 may be the same or different, and the thickness of the first substrate 11, the second substrate 12, the third substrate 21 and the fourth substrate 22 may respectively range from 0.01 mm to 0.5 mm, for example, 0.01 mm to 0.03 mm, or 0.15 mm to 0.5 mm; but the present disclosure is not limited thereto. In one embodiment of the present disclosure, the thicknesses of the first substrate 11 and the second substrate 12 may be respectively greater than the thicknesses of the third substrate 21 and the fourth substrate 22. For example, the thicknesses of the first substrate 11 and the second substrate 12 may respectively range from 0.15 mm to 0.5 mm, and the thicknesses of the third substrate 21 and the fourth substrate 22 may respectively range from 0.01 mm to 0.03 mm. In one embodiment of the present disclosure, the first substrate 11 and the second substrate 12 may be rigid substrates, and the third substrate 21 and the fourth substrate 22 may be flexible substrates; but the present disclosure is not limited thereto. By designing the thicknesses of the first substrate 11, the second substrate 12, the third substrate 21 and the fourth substrate 22 within the aforesaid ranges, the electronic device has the effect of being thinner.

In the present disclosure, the materials of the first conductive layer 13, the second conductive layer 14, the third conductive layer 23 and the fourth conductive layer 24 may be the same or different. The materials of the first conductive layer 13, the second conductive layer 14, the third conductive layer 23 and the fourth conductive layer 24 may respectively comprise a metal, a metal oxide, an alloy thereof or a combination thereof, and for example, may be gold, silver, copper, aluminum, chromium, platinum, indium zinc oxide (IZO), indium tin oxide (ITO), indium tin zinc oxide (ITZO), indium gallium zinc oxide (IGZO), aluminum zinc oxide (AZO) or a combination thereof; but the present disclosure is not limited thereto. In one embodiment of the present disclosure, the first conductive layer 13, the second conductive layer 14, the third conductive layer 23 and the fourth conductive layer 24 may respectively comprise a metal oxide, such as indium tin oxide.

In the present disclosure, the materials of the first light modulating layer 15 and the second light modulating layer 25 may be the same or different. The materials of the first light modulating layer 15 and the second light modulating layer 25 may respectively comprise guest host type liquid crystals (GHLCs), dye liquid crystals, twisted nematic liquid crystals (TN LCs), super twisted nematic liquid crystals (STN LCs), polymer dispersed liquid crystals (PDLCs), polymer network liquid crystals (PNLCs), cholesteric texture liquid crystals, polymer-stabilized cholesteric texture liquid crystals (PSCT LCs), suspended particle materials (SPD), electrochromic materials or a combination thereof, but the present disclosure is not limited thereto.

In the present disclosure, the materials of the first bonding pad P1 and the second bonding pad P2 may be the same or different. The materials of the first bonding pad P1 and the second bonding pad P2 may respectively comprise a metal, a metal oxide, an alloy thereof or a combination thereof, and for example, may be gold, silver, copper, aluminum, chromium, platinum, indium zinc oxide (IZO), indium tin oxide (ITO), indium tin zinc oxide (ITZO), indium gallium zinc oxide (IGZO), aluminum zinc oxide (AZO) or a combination thereof, but the present disclosure is not limited thereto. In one embodiment of the present disclosure, the first bonding pad P1 and the second bonding pad P2 may respectively comprise a metal. In the present disclosure, the materials of the first bonding pad P1 and the second bonding pad P2 may be different from the materials of the first conductive layer 13, the second conductive layer 14, the third conductive layer 23 or the fourth conductive layer 24. In the present disclosure, the first conductive connector 41 may be conductive glue, metal wire, metal foil, silver glue or other conductive materials; but the present disclosure is not limited thereto. In the present disclosure, the circuit board 3 may comprise a printed circuit board (PCB), a flexible printed circuit (FPC) or a combination thereof. In one embodiment of the present disclosure, the resistance of the circuit board 3 may be different from the resistance of the first conductive connector 41. The "different" means that the two values are different or the difference needs to be more than 10%. In one embodiment of the present disclosure, the resistance of the first conductive connector 41 may be less than 0.1 ohms/square inch, for example, less than 0.03 ohms/square inch or less than 0.07 ohms/square inch, but the present disclosure is not limited thereto. In one embodiment of the present disclosure, the resistance of the circuit board 3 may be greater than 0.13 ohms/square inch, but the present disclosure is not limited thereto.

In the present disclosure, the materials of the first supporting unit PS1 and the second supporting unit PS2 may be the same or different. The materials of the first supporting unit PS1 and the second supporting unit PS2 may respectively comprise resin, polymer, photoresist material or a combination thereof, but the present disclosure is not limited thereto. In the present disclosure, the shapes, the sizes and the numbers of the first supporting unit PS1 and the second supporting unit PS2 are not particularly limited and may be adjusted according to the needs. For example, suitable shapes include rectangular columns, trapezoidal columns, inverted trapezoidal columns, cylinders or a combination thereof, but the present disclosure is not limited thereto.

In one embodiment of the present disclosure, as shown in FIG. 1 and FIG. 2, the electronic device may further comprise a second conductive connector 42 electrically connected to the first panel 1 and the second panel 2. The second conductive connector 42 may be used to input a second signal. More specifically, the second signal may be input to the third bonding pad P3 of the first panel 1 through the circuit board 3, and input to the fourth bonding pad P4 of the second panel 2 through the second conductive connector 42. In one embodiment of the present disclosure, as shown in FIG. 2, in the top view direction Z of the electronic device, the third bonding pad P3 is farther away from circuit board 3 than first bonding pad P1. In one embodiment of the present disclosure, as shown in FIG. 2, in the top view direction Z of the electronic device, the third bonding pad P3 is between the fourth bonding pad P4 and the first edge e1. In one embodiment of the present disclosure, as shown in FIG. 2, in the top view direction Z of the electronic device, the third bonding pad P3 may be between the first edge e1 and the third edge e3. In the present disclosure, the third bonding pad P3 and the fourth bonding pad P4 are similar to the first bonding pad P1 and the second bonding pad P2, and the second conductive connector 42 is similar to the first conductive connector 41, so those are not described here again. In the present disclosure, the first signal and the second signal may respectively be, for example, a scan signal, a data signal, an electrode signal or a combination thereof, but the present disclosure is not limited thereto. In one embodiment, the first signal and the second signal, for example, may respectively control the voltage on the first panel 1 (for example, the voltage of the first conductive layer 13 and the second conductive layer 14) and the voltage on the second panel 2 (for example, the voltage of the third conductive layer 23 and the fourth conductive layer 24), causing the liquid crystal rotation of the first panel or the second panel to change or the haze to change to achieve the effect of changing the light transmittance, but the present disclosure is not limited thereto. In another embodiment, the first signal and the second signal may simultaneously control the voltage on the first panel 1 (for example, the voltage of the first conductive layer 13 and the second conductive layer 14) and the voltage on the second panel 2 (for example, the voltage of the third conductive layer 23 and the fourth conductive layer 24).

In one embodiment of the present disclosure, as shown in FIG. 3A and FIG. 3B, the electronic device may further comprise: an adhesion layer 5 disposed between the first panel 1 and the second panel 2. The adhesion layer 5 may be used to adhere the first panel 1 and the second panel 2 to assemble the first panel 1 and the second panel 2 into one. In the present disclosure, the adhesion layer 5 may comprise glass glue, optical glue, silicone glue, tape, hot melt glue, AB glue, two-component adhesive, polymer glue or a combination thereof; but the present disclosure is not limited thereto.

In one embodiment of the present disclosure, as shown in FIG. 1, FIG. 3A and FIG. 3B, the electronic device may further comprise: a first polarizer 61 disposed on the side of the second panel 2 away from the first panel 1 in the Z-axis direction; a second polarizer 62 disposed between the first panel 1 and the second panel 2 in the Z-axis direction; and a third polarizer 63 disposed on the side of first panel 1 away from second panel 2 in the Z-axis direction. In the present disclosure, the polarizing axes of the first polarizer 61, the second polarizer 62 and the third polarizer 63 may be parallel to each other, wherein, the polarizing axes of the polarizers can be shown by the arrow in FIG. 3A, for example.

In one embodiment of the present disclosure, as shown in FIG. 3A and FIG. 3B, in the top view direction Z of the electronic device, the area of the first polarizer 61 may be approximately equal to the area of the fourth substrate 22; the area of the second polarizer 62 may be approximately equal to the area of the second substrate 12 or the third substrate 21; the area of the third polarizer 63 may be approximately equal to the area of the first substrate 11; but the present disclosure is not limited thereto. The "area of the polarizer" refers to the projection area of the polarizer in the top view direction Z of the electronic device. The "area of the substrate" refers to the projection area of the substrate in the top view direction Z of the electronic device.

In one embodiment of the present disclosure, as shown in FIG. 3A and FIG. 3B, the electronic device may further comprise a third panel 7, wherein the first panel 1 and the second panel 2 are disposed on the third panel 7. More specifically, the third panel 7 may be a display panel, so the third panel 7 may comprise: a fifth substrate 71; a sixth substrate 72 opposite to the fifth substrate 71; and a light modulating layer 73 disposed between the fifth substrate 71 and the sixth substrate 73. In the present disclosure, even not shown in the figure, a conductive layer, a driving element, a display element, a conductive line, an alignment layer, a black matrix later, a color filter element, an electrode, other components or a combination thereof may be disposed on the fifth substrate 71 and the sixth substrate 72; but the present disclosure is not limited thereto. In the present disclosure, the light modulating layer 73 may comprise liquid crystals (LCs), quantum dots (QDs), fluorescent molecules, phosphors, organic light emitting diodes (OLEDs), mini LEDs, micro LEDs, quantum dot LEDs (QLEDs or QD-LEDs) or a combination thereof; but the present disclosure is not limited thereto.

In one embodiment of the present disclosure, when the display panel is a liquid crystal display panel, transistors (TFTs) may be disposed on the fifth substrate 71, and color filter elements may be disposed on the sixth substrate 72; but the present disclosure is not limited thereto. In one embodiment of the present disclosure, when the display panel is a liquid crystal display panel, the fifth substrate 71 may be a TFT substrate integrated with color filter array, and the sixth substrate 72 may be an opposite substrate; but the present disclosure is not limited thereto. In one embodiment of the present disclosure, when the display panel is a self-luminous display panel, the fifth substrate 71 may be a transistor substrate (a TFT substrate), and the sixth substrate 72 may be a cover substrate; but the present disclosure is not limited thereto. In one embodiment of the present disclosure, when the display panel is a non-self-illuminating display panel, as shown in FIG. 3A and FIG. 3B, the electronic device may further comprise a backlight module 8, and the third panel 7 is disposed on the backlight module 8. In the present disclosure, even not shown in the figure, the backlight module 8 may comprise a light-emitting unit, a light guide plate, a diffusion plate, a brightness enhancement film, a prism sheet, a reflective sheet, other optical films or a combination thereof; but the present disclosure is not limited thereto. In one embodiment of the present disclosure, when the display panel is a self-luminous display panel, the backlight module 8 shown in FIG. 3A and FIG. 3B may be omitted.

In one embodiment of the present disclosure, as shown in FIG. 3A and FIG. 3B, the electronic device may further comprise: a fourth polarizer 64 disposed between the first panel 1 and the third panel 7; and a fifth polarizer 65, wherein the third panel 7 may be disposed on the fifth polarizer 65. More specifically, the fifth polarizer 65 may be disposed between the third panel 7 and the backlight module 8. In the present disclosure, the polarizing axis of the fourth polarizer 64 is different from the polarizing axis of the fifth polarizer 65. For example, the polarizing axis of the fourth polarizer 64 is perpendicular to the polarizing axis of the fifth polarizer 65. Herein, the polarizing axes of the polarizers may be shown by the arrow in FIG. 3A. In one embodiment of the present disclosure, the polarizing axis of the fourth polarizer 64 may be parallel to the polarizing axis of the first polarizer 61.

In one embodiment of the present disclosure, as shown in FIG. 3A, the electronic device may further comprise protection layers PL1, PL2, wherein the protection layer PL1 is disposed on the first substrate 11, and the protection layer PL2 is disposed on the third substrate 21. More specifically, the protection layer PL1 may cover the first bonding pad P1, part of the first conductive layer 13 and part of the first conductive connector 41, and the protection layer PL2 may cover the second bonding pad P2, part of the third conductive layer 23 and part of the first conductive connector 41. The protection layers PL1, PL2 can reduce the entry of outside air or moisture, or/and improve the adhesion of the first conductive connector 41, thereby improving the reliability of the electronic device. Similarly, in other embodiments of the present disclosure, even not shown in the figure, the third bonding pad P3 (as shown in FIG. 2) and the fourth bonding pad P4 (as shown in FIG. 2) may also be covered by protection layers, which is not described here again. In the present disclosure, the materials of the protection layers PL1, PL2 may comprise glass glue, optical glue, silicone glue, tape, hot melt glue, AB glue, two-component adhesive, light-curing glue, polymer glue, resin or a combination thereof, but the present disclosure is not limited thereto.

In one embodiment of the present disclosure, as shown in FIG. 3A, the electronic device may further comprise another protection layer PL3 covering the first conductive connector 41, wherein the protection layer PL3 may expose two ends of the first conductive connector 41, so the first conductive connector 41 can be electrically connected to the first panel 1 and the second panel 2 through the two ends thereof, respectively. The protection layer PL3 may reduce the direct contact between the first conductive connector 41 and the internal components of the electronic device, thereby reducing the risk of short circuits. In the present disclosure, the material of the protection layer PL3 may comprise glass glue, optical glue, silicone glue, hot melt glue, AB glue, light-curing glue, polymer glue, resin or a combination thereof; but the present disclosure is not limited thereto. Similarly, in other embodiments of the present disclosure, even not shown in the figure, the second conductive connector 42 may also be covered by another protection layer, which is not described again here.

The electrical connection relationship between the first panel 1 and the second panel 2 will be further described below.

Figure 4:
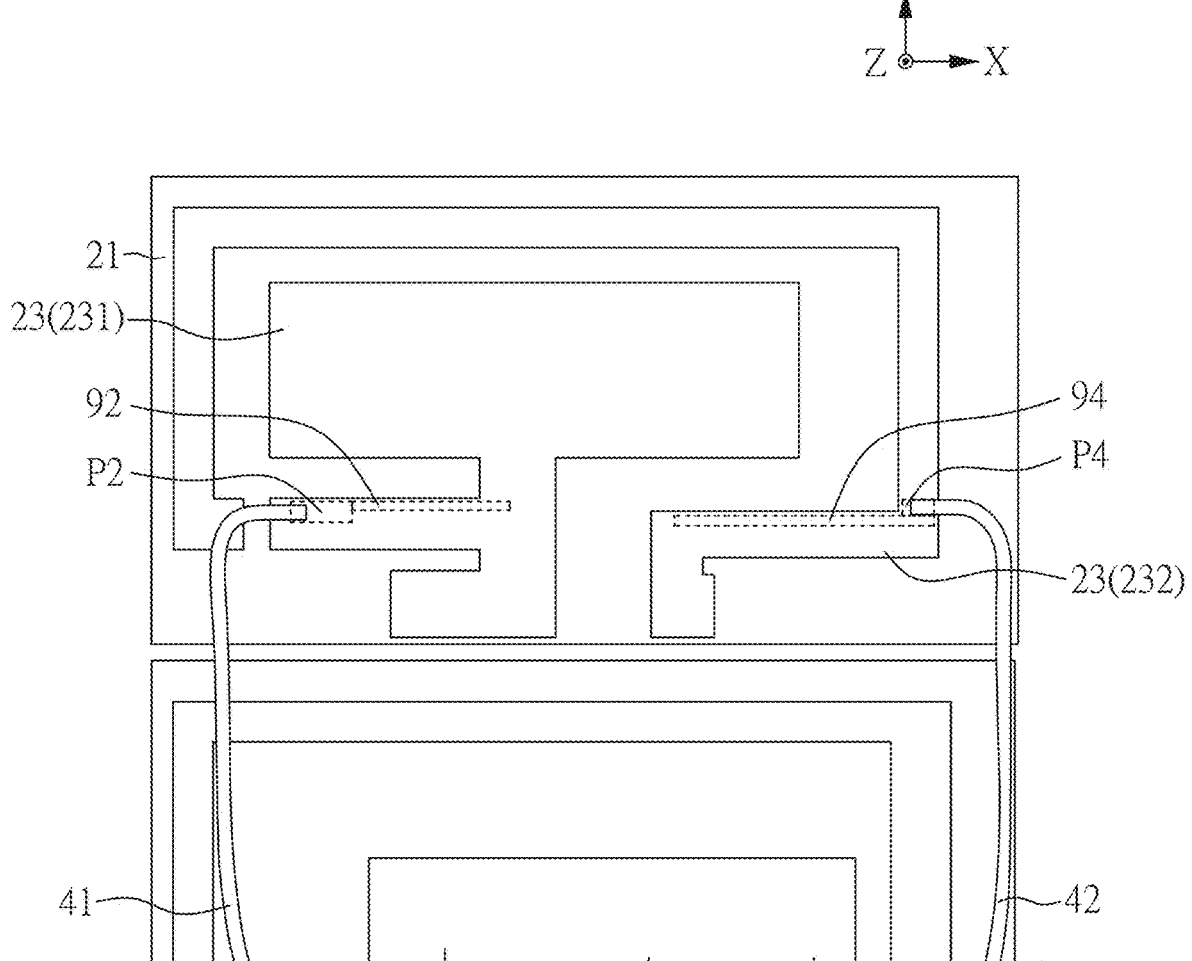
FIG. 4 is a schematic diagram showing the electrical connection relationship between the first panel and the second panel of an electronic device according to one embodiment of the present disclosure.

FIG. 4 is a schematic diagram showing the electrical connection relationship between the first panel and the second panel of an electronic device according to one embodiment of the present disclosure. Herein, some components are omitted for convenience of explanation. In the top view direction of the electronic device, the first substrate in the first panel and the third substrate in the second panel partially overlapped are shown in a non-overlapping manner in FIG. 4.

In one embodiment of the present disclosure, as shown in FIG. 4, the first substrate 11 of the first panel 1 is disposed with the first bonding pad P1 and the first conductive layer 13, wherein part of the first conductive layer 13 is disposed on the first bonding pad P1, the first conductive connector 41 may be electrically connected to the first bonding pad P1 through the first conductive layer 13. The third substrate 21 of the second panel 2 is disposed with the second bonding pad P2 and the third conductive layer 23, wherein part of the third conductive layer 23 is disposed on the second bonding pad P2, and the first conductive connector 41 may be electrically connected to the second bonding pad P2 through the third conductive layer 23. Thus, the first signal may be input to the first bonding pad P1 on the first substrate 11 through the circuit board (not shown in the figure), and input to the second bonding pad P2 on the third substrate 21 through the first conductive connector 41.

In addition, as shown in FIG. 4, the first substrate 11 of the first panel 1 is also disposed with the third bonding pad P3, wherein part of the first conductive layer 13 is disposed on the third bonding pad P3, and the second conductive connector 42 may be electrically connected to the third bonding pad P3 through the first conductive layer 13. The third substrate 21 of the second panel 2 is also disposed with the fourth bonding pad P4, wherein part of the third conductive layer 23 is disposed on the fourth bonding pad P4, and the second conductive connector 42 is electrically connected to the fourth bonding pad P4 through the third conductive layer 23. Thus, the second signal may be input to the third bonding pad P3 on the first substrate 11 through the circuit board (now shown in the figure), and input to the fourth bonding pad P4 on the third substrate 23 through the second conductive connector 42.

More specifically, as shown in FIG. 1 and FIG. 4, the first conductive layer 13 may comprise a first portion 131 and a second portion 132, and the first portion 131 and the second portion 132 are electrically insulated. The third conductive layer 23 may comprise a third portion 231 and a fourth portion 232, and the third portion 231 and the fourth portion 232 are electrically insulated. The first signal may be input to the first portion 131 of the first conductive layer 13 through the circuit board 3 to input the first signal to the first panel 1. The first signal may be input to the first portion 131 of the first conductive layer 13 and the first bonding pad P1 through the circuit board 3, and input to the second bonding pad P2 and the third portion 231 of the third conductive layer 23 through the first conductive connector 41, to input the first signal to the second panel 2. The second signal may be input to the second portion 132 of the first conductive layer 13 through the circuit board 3, and input to the second conductive layer 14 through a conductive material (not shown in the figure), to input the second signal to the first panel 1. The second signal may be input to the second portion 132 of the first conductive layer 13 and the third bonding pad P3 through the circuit board 3, input to the fourth bonding pad P4 and the fourth portion 232 of the third conductive layer 23 through the second conductive connector 42, and input to the fourth conductive layer 24 through a conductive material (not shown in the figure), to input the second signal to the second panel 2.

In one embodiment of the present disclosure, as shown in FIG. 4, the first substrate 11 may be further disposed with a position marker M, wherein part of the first conductive layer 13 is disposed on the position marker M. The position marker M can provide position indication when the circuit board (not shown in the figure) is connected. In the present disclosure, the material of the position marker M may comprise a metal, for example, may be gold, silver, copper, aluminum, chromium, platinum, an alloy thereof or a combination thereof; but the present disclosure is not limited thereto. In one embodiment of the present disclosure, the material of the position marker M may be the same to the material of the first bonding pad P1 or the third bonding pad P3. In addition, the position marker M may be prepared by the same process for preparing the first bonding pad P1 or the third bonding pad P3, so the position marker M and the first bonding pad P1 or the third bonding pad P3 may be disposed on the same layer.

In one embodiment of the present disclosure, as shown in FIG. 4, the electronic device may further comprise: a first conductive line 91 disposed on the first substrate 11, wherein part of the first conductive layer 13 is disposed on the first conductive line 91; a second conductive line 92 disposed on the third substrate 21, wherein part of the third conductive layer 23 is disposed on the second conductive line 92, wherein the first conductive line 91 is electrically connected to the first bonding pad P1, and the second conductive line 92 is electrically connected to the second bonding pad P2. Similarly, as shown in FIG. 4, the electronic device may further comprise: a third conductive line 93 disposed on the first substrate 11, wherein part of the first conductive layer 13 is disposed on the third conductive line 93; and a fourth conductive line 94 disposed on the third substrate 21, wherein part of the third conductive layer 23 is disposed on the fourth conductive line 94, wherein the third conductive line 93 is electrically connected to the third bonding pad P3, and the fourth conductive line 94 is electrically connected to the fourth bonding pad P4. Thus, the first signal may be input to the first conductive line 91 and the first bonding pad P1 through the circuit board (not shown in the figure), and input to the second bonding pad P2 and the second conductive line 92 through the first conductive connector 41. Similarly, the second signal may be input to the third conductive line 93 and the third bonding pad P3 through the circuit board (not shown in the figure), and input to the fourth bonding pad P4 and the fourth conductive line 94 through the second conductive connector 42. The dispositions of the first conductive line 91, the second conductive line 92, the third conductive line 93 and/or the fourth conductive line 94 may reduce the resistance.

In one embodiment of the present disclosure, as shown in FIG. 4, the first portion 131 of the first conductive layer 13 has an extension portion 131A extending along the X direction. In the top view direction Z of the electronic device, part of the extension portion 131A and the first conductive line 91 are overlapped. In a direction perpendicular to the top view direction Z of the electronic device (for example, the Y direction), the extension portion 131A has a first width W1, the first conductive line 91 has a second width W2, wherein the first width W1 is greater than the second width W2. In one embodiment of the present disclosure, as shown in FIG. 4, the second portion 132 of the first conductive layer 13 has an extension portion 132A extending along the X direction. In the top view direction Z of the electronic device, part of the extension portion 132A and the third conductive line 93 are overlapped. In a direction perpendicular to the top view direction Z of the electronic device (for example, the Y direction), the extension portion 132A has a third width W3, the third conductive line 93 has a fourth width W4, and the third width W3 is greater than the fourth width W4. Similarly, the second conductive line 92 and the third portion 231 of the third conductive layer 23 may also have similar characteristics to the first conductive line 91 and the first portion 131 of the first conductive layer 13, and the fourth conductive line 94 and the fourth portion 232 of the third conductive layer 23 may also have similar characteristics to the third conductive line 93 and the second portion 132 of the first conductive layer 13, which are not described here again.

In one embodiment of the present disclosure, the materials of the first conductive line 91, the second conductive line 92, the third conductive line 93 and the fourth conductive line 94 may be the same or different. The materials of the first conductive line 91, the second conductive line 92, the third conductive line 93 and the fourth conductive line 94 may respectively comprise a metal, an alloy thereof or a combination thereof, and for example, may be gold, silver, copper, aluminum, chromium, platinum, an alloy thereof or a combination thereof; but the present disclosure is not limited thereto. In one embodiment of the present disclosure, the materials of the first conductive line 91, the second conductive line 92, the third conductive line 93 and the fourth conductive line 94 may be respectively different from the material of the first conductive layer 13, the second conductive layer 14, the third conductive layer 23 or the fourth conductive layer 24. In one embodiment of the present disclosure, the materials of the first conductive line 91, the second conductive line 92, the third conductive line 93 and the fourth conductive line 94 may be respectively the same as the materials of the first bonding pad P1 and the second bonding pad P2, and the first conductive line 91, the second conductive line 92, the third conductive line 93 and the fourth conductive line 94 may be respectively prepared by the same process for preparing the first bonding pad P1 and the second bonding pad P2, so the first conductive line 91, third conductive line 93 and the first bonding pad P1 locate at the same layer, and the second conductive line 92, the fourth conductive line 94 and the second bonding pad P2 locate at the same layer.

Figure 5:
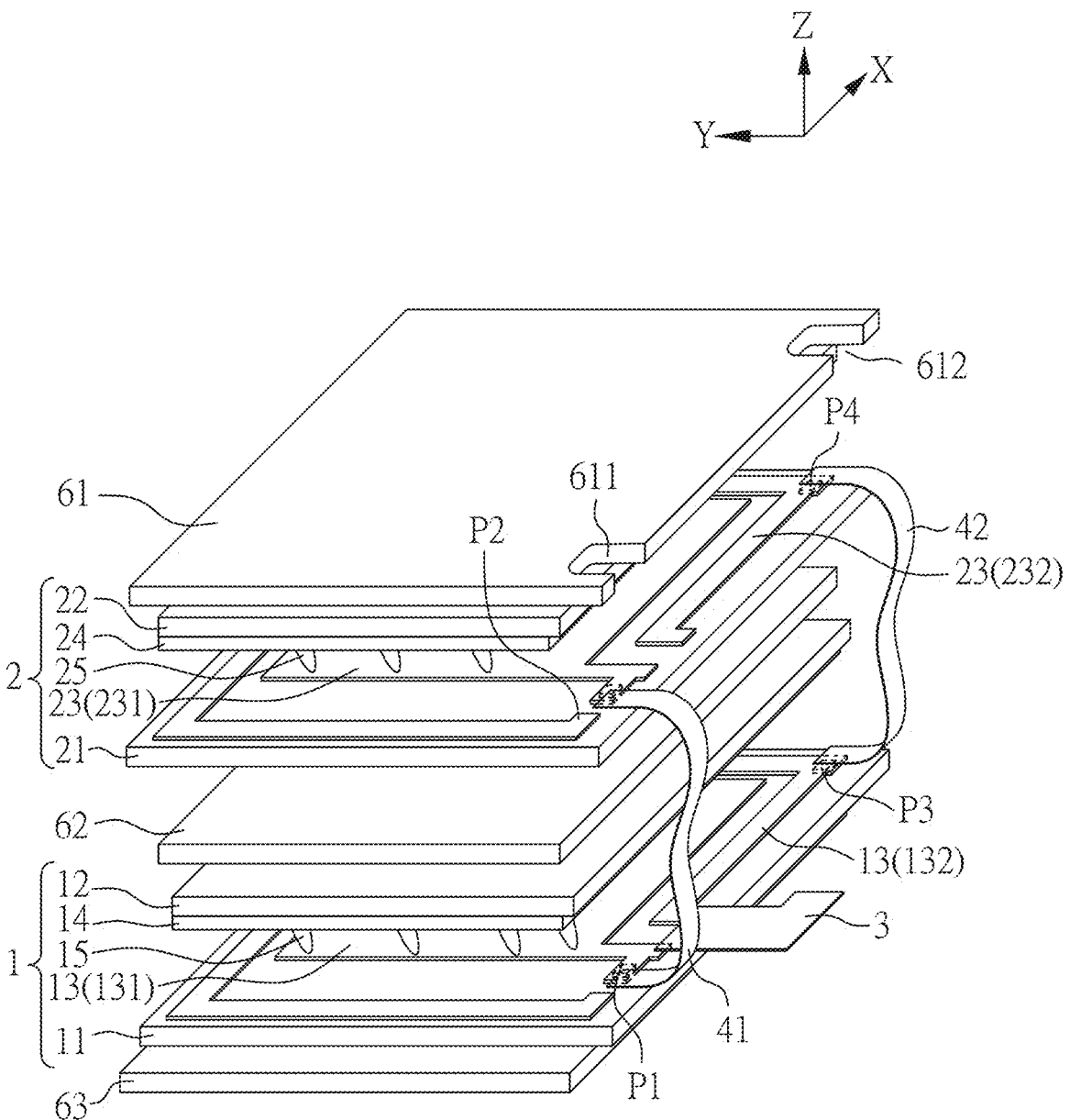
FIG. 5 is an explosion diagram showing an electronic device according to one embodiment of the present disclosure.
Figure 6:
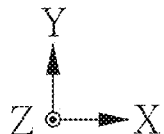
FIG. 6 is a schematic top view of FIG. 5.
Figure 6:
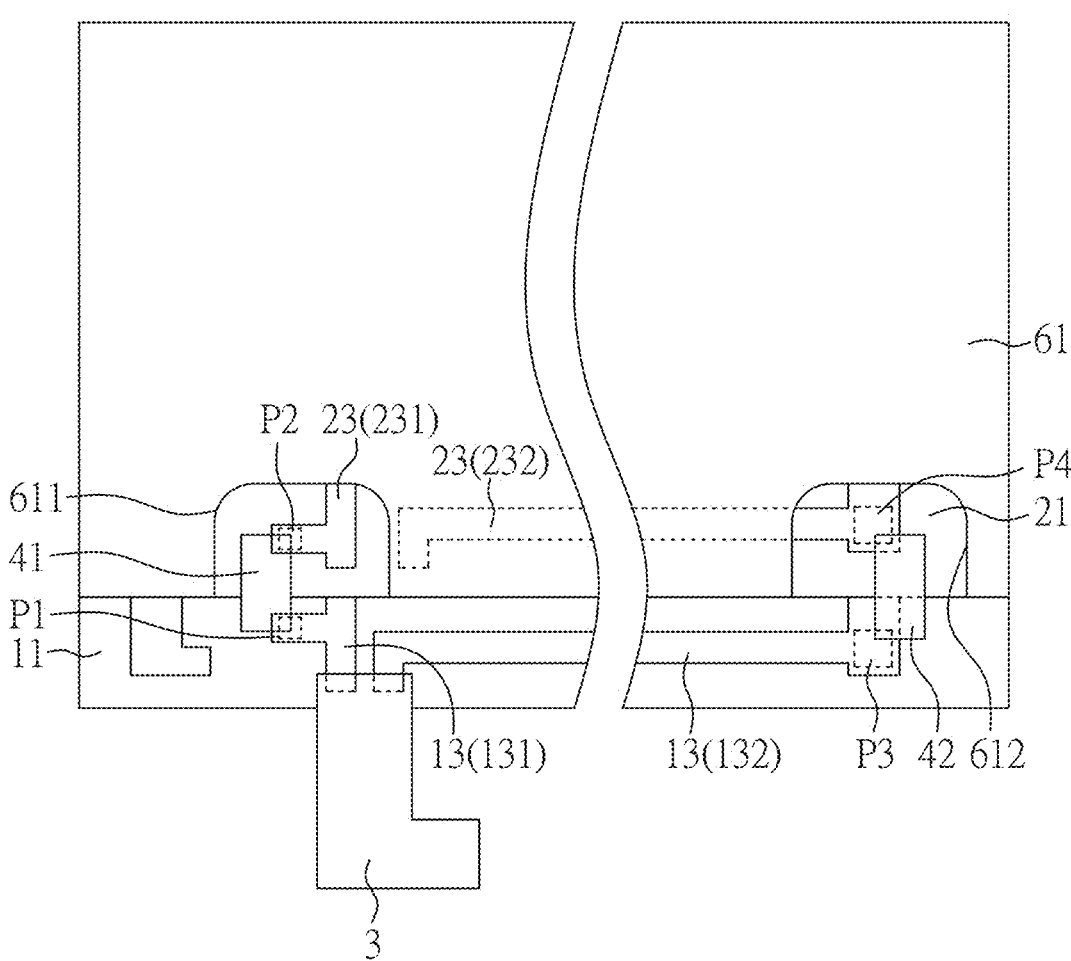

FIG. 5 is an explosion diagram showing an electronic device according to one embodiment of the present disclosure. FIG. 6 is a schematic top view of FIG. 5. Herein, the electronic device shown in FIG. 5 and FIG. 6 are similar to those shown in FIG. 1 and FIG. 2, except for the following differences.

In one embodiment of the present disclosure, as shown in FIG. 5, the first polarizer 61 has a concave 611 corresponding to the first conductive connector 41. More specifically, as shown in FIG. 6, in the top view direction Z of the electronic device, the concave 611 of the first polarizer 61 may expose part of the third substrate 21, part of the third conductive layer 23 and the second bonding pad P2. In other words, in the top view direction Z of the electronic device, the first polarizer 61 and the second bonding pad P2 are not overlapped. Similarly, as shown in FIG. 5 and FIG. 6, the first polarizer 61 may have another concave 612 locating corresponding to the second conductive connector 42. More specifically, in the top view direction Z of the electronic device, the concave 612 of the first polarizer 61 may expose part of the third substrate 21, part of the third conductive layer 23 and the fourth bonding pad P4. In other words, in the top view direction Z of the electronic device, the first polarizer 61 and the fourth bonding pad P4 are not overlapped. In one embodiment of the present disclosure, in the top view direction Z of the electronic device, the area of the first polarizer 61 is different from the area of the fourth substrate 22. For example, the area of the first polarizer 61 may be greater than the area of the fourth substrate 22.

Figure 7:
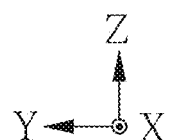
FIG. 7 is a schematic cross-sectional view of an electronic device according to one embodiment of the present disclosure.

FIG. 7 is a schematic cross-sectional view of an electronic device according to one embodiment of the present disclosure. The electronic device shown in FIG. 7 is similar to that shown in FIG. 3A, except for the following differences.

In one embodiment of the present disclosure, as shown in FIG. 7, the first substrate 11 has a first edge e1; the second substrate 12 has a second edge e2; the third substrate 21 has a third edge e3; and the fourth substrate 22 has a fourth edge e4. The first edge e1, the second edge e2, the third edge e3 and the fourth edge e4 are parallel to each other, and the distance between the first edge e1 and the second edge e2 is different from the distance between the third edge e3 and the fourth edge e4. More specifically, as shown in FIG. 7, there is a first distance D1 between the first edge e1 and the second edge e2, there is a second distance D2 between the third edge e3 and the fourth edge e4, and the first distance D1 is different from the second distance D2.

In one embodiment of the present disclosure, as shown in FIG. 7, the thickness T1 of the first bonding pad P1 may be greater than the thickness T2 of the first conductive layer 13. In this way, the contact resistance can be reduced, thereby improving the conductivity. In one embodiment of the present disclosure, the thickness T1 of the first bonding pad P1 may be 0.05 μm to 0.5 μm, but the present disclosure is not limited thereto. The thickness T2 of the first conductive layer 13 may be 0.01 μm to 0.2 μm, but the present disclosure is not limited thereto. In one embodiment of the present disclosure, similarly, the thickness of the second bonding pad P2 may be greater than the thickness of the third conductive layer 23. For example, the thickness of the second bonding pad P2 may be 0.05 μm to 0.5 μm or 0.05 μm to 0.2 μm, and the thickness of the third conductive layer 23 may be 0.01 μm to 0.2 μm or 0.05 μm to 0.2 μm; but the present disclosure is not limited thereto.

In one embodiment of the present disclosure, as shown in FIG. 7, the first substrate 11 may be disposed on the second substrate 12, and the first substrate 11 may be disposed between the second substrate 12 and the third substrate 21. In one embodiment of the present disclosure, the thicknesses of the first substrate 11 and the second substrate 12 may be respectively less than the thicknesses of the third substrate 21 and the fourth substrate 22. For example, the thicknesses of the first substrate 11 and the second substrate 12 may respectively be 0.01 mm to 0.03 mm, and the thicknesses of the third substrate 21 and the fourth substrate 22 may respectively be 0.15 mm to 0.5 mm; but the present disclosure is not limited thereto. In one embodiment of the present disclosure, the first substrate 11 and the second substrate 12 may be flexible substrates, and the third substrate 21 and the fourth substrate 22 may be rigid substrates; but the present disclosure is not limited thereto.

In one embodiment of the present disclosure, as shown in FIG. 7, in the top view direction Z of the electronic device, the area of the first polarizer 61 may be approximately the same as the area of the fourth substrate 22; the area of the second polarizer 62 may be approximately the same as the area of the first substrate 11 or the third substrate 21; the area of the third polarizer 63 may be approximately the same as the area of the second substrate 12; but the present disclosure is not limited thereto. The "area of the polarizer" refers to the projection area of the polarizer in the top view direction Z of the electronic device. The "area of the substrate" refers to the projection area of the substrate in the top view direction Z of the electronic device.

In addition, in one embodiment of the present disclosure, when the third panel 7 is a self-luminous display panel, the backlight module 8 shown in FIG. 7 may be omitted.

Figure 8:
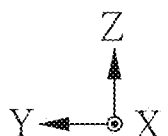
FIG. 8 is a schematic cross-sectional view of an electronic device according to one embodiment of the present disclosure.
Figure 8:
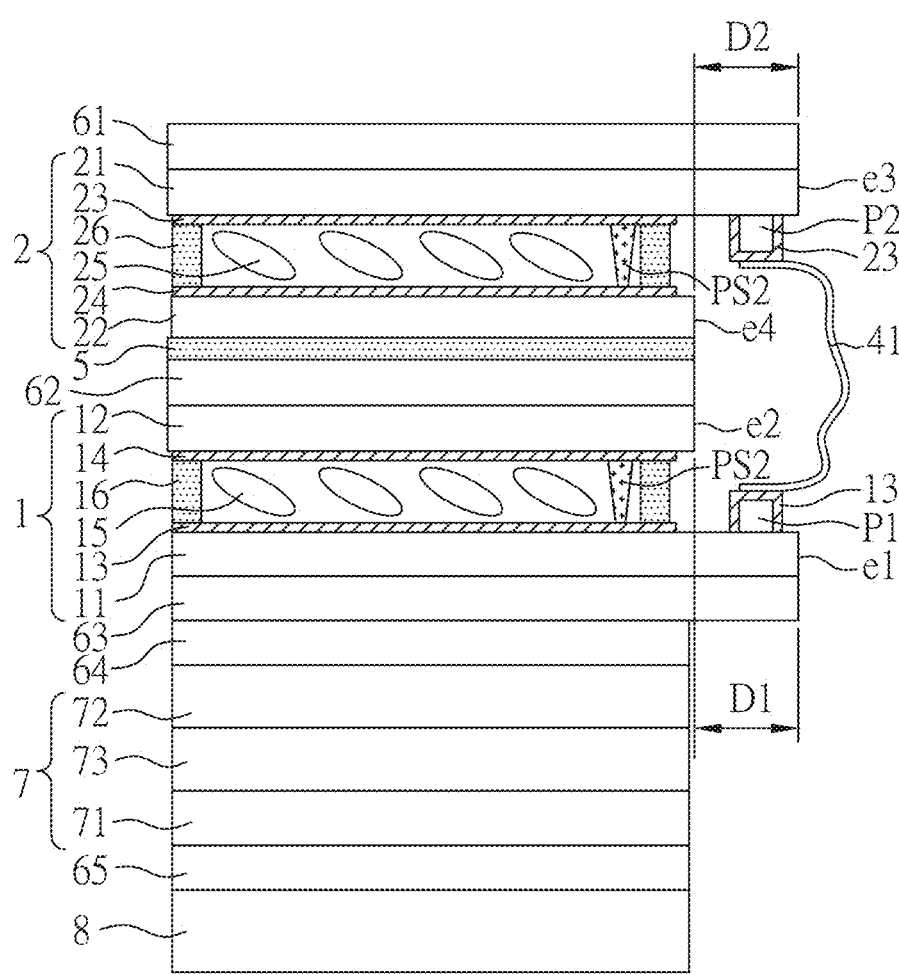

FIG. 8 is a schematic cross-sectional view of an electronic device according to one embodiment of the present disclosure. The electronic device shown in FIG. 8 is similar to that shown in FIG. 3A, except for the following differences.

In one embodiment of the present disclosure, as shown in FIG. 8, the third substrate 21 may be disposed on the fourth substrate 22, and the fourth substrate 22 may be disposed between the second substrate 12 and the third substrate 21. In one embodiment of the present disclosure, the thicknesses of the first substrate 11, the second substrate 12, the third substrate 21 and the fourth substrate 22 may be approximately the same. For example, the thicknesses of the first substrate 11, the second substrate 12, the third substrate 21 and the fourth substrate 22 may be respectively 0.01 to 0.05 mm, but the present disclosure is not limited thereto. By designing the thicknesses of the first substrate 11, the second substrate 12, the third substrate 21 and the fourth substrate 22 within the above range, the electronic device can be made thinner.

In one embodiment of the present disclosure, as shown in FIG. 8, in the top view direction Z of the electronic device, the area of the first substrate 11 may be approximately the same as the area of the third substrate 21; and the area of the second substrate 12 may be approximately the same as the area of the fourth substrate 22. Thus, the first distance D1 between the first edge e1 and the second edge e2 may be approximately equal to the second distance D2 between the third edge e3 and the fourth edge e4. Thus, an electronic device with narrow bezels can be available. In addition, as shown in FIG. 8, the area of the first polarizer 61 may be approximately the same as the area of the third substrate 21, the area of the second polarizer 62 may be approximately the same as the area of the second substrate 12 or the fourth substrate 22, and the area of the third polarizer 63 may be approximately the same as the area of the first substrate 11; but the present disclosure is not limited thereto.

In addition, in one embodiment of the present disclosure, when the third panel 7 is a self-luminous display panel, the backlight module 8 shown in FIG. 8 can be omitted.

Figure 9:
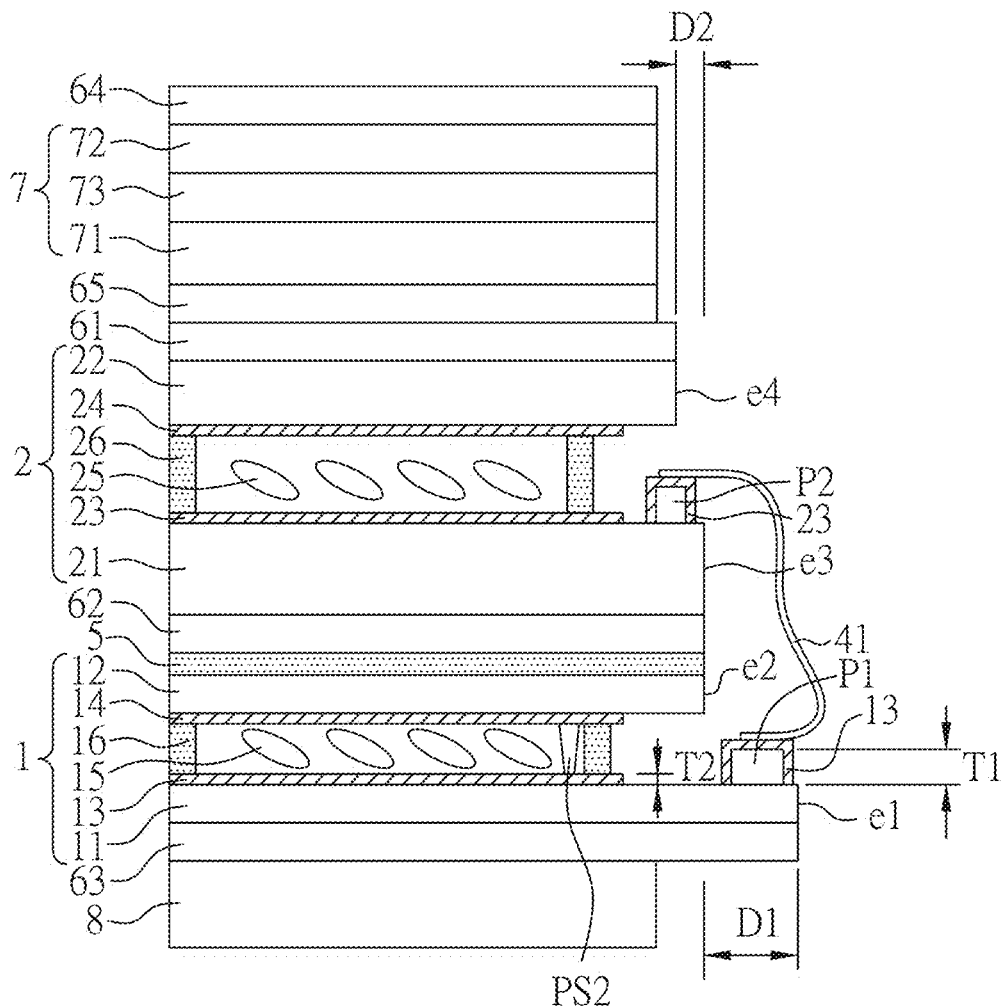
FIG. 9 is a schematic cross-sectional view of an electronic device according to one embodiment of the present disclosure.

FIG. 9 is a schematic cross-sectional view of an electronic device according to one embodiment of the present disclosure. The electronic device shown in FIG. 9 is similar to that shown in FIG. 3A, except for the following differences.

In one embodiment of the present disclosure, as shown in FIG. 9, the third panel 7 may be disposed on the first panel 1 and the second panel 2; the fourth polarizer 64 may be disposed on the third panel 7; and the fifth polarizer 65 may be disposed on the first panel 1 and the second panel 2. More specifically, the fifth polarizer 65 may be disposed between the third panel 7 and the second panel 2. In the present disclosure, the polarizing axis of the fourth polarizer 64 is different from the polarizing axis of the fifth polarizer 65. For example, the polarizing axis of the fourth polarizer 64 is perpendicular to the polarizing axis of the fifth polarizer 65. In one embodiment of the present disclosure, the polarizing axis of the fifth polarizer 65 may be parallel to the polarizing axis of the first polarizer 61.

In one embodiment of the present disclosure, as shown in FIG. 9, the first substrate 11 has a first edge e1; the second substrate 12 has a second edge e2; the third substrate 21 has a third edge e3; and the fourth substrate 22 has a fourth edge e4. Herein, the first edge e1, the second edge e2, the third edge e3 and the fourth edge e4 are parallel to each other, and the distance between the first edge e1 and the second edge e2 is different from the distance between the third edge e3 and the fourth edge e4. More specifically, as shown in FIG. 9, there is a first distance D1 between the first edge e1 and the second edge e2, there is a second distance D2 between the third edge e3 and the fourth edge e4, and the first distance D1 is different from the second distance D2.

In one embodiment of the present disclosure, as shown in FIG. 9, the size of the first bonding pad P1 may be different from the size of the second bonding pad P2. The "size of the bonding pad" refers to the length, the width or the height of the bonding pad. In one embodiment of the present disclosure, the thickness T1 of the first bonding pad P1 may be greater than the thickness T2 of the first conductive layer 13. Thus, the contact resistance can be reduced, thereby improving the conductivity. In one embodiment of the present disclosure, the thickness T1 of the first bonding pad P1 may be 0.05 μm to 0.5 μm; but the present disclosure is not limited thereto. The thickness T2 of the first conductive layer 13 may be 0.01 μm to 0.2 μm; but the present disclosure is not limited thereto.

In one embodiment of the present disclosure, as shown in FIG. 9, the thicknesses of the first substrate 11 and the second substrate 12 may be respectively less than the thicknesses of the third substrate 21 and the fourth substrate 22. For example, the thicknesses of the first substrate 11 and the second substrate 12 may be respectively 0.01 mm to 0.03 mm, the thicknesses of the third substrate 21 and the fourth substrate 22 may be respectively 0.15 mm to 0.5 mm; but the present disclosure is not limited thereto. In one embodiment of the present disclosure, the first substrate 11 and the second substrate 12 may be flexible substrates and the third substrate 21 and the fourth substrate 22 may be rigid substrates; but the present disclosure is not limited thereto.

In addition, in one embodiment of the present disclosure, the third panel 7 may be disposed under the first panel 1 and the second panel 2, wherein the third panel 7 is disposed between the first panel 1 and the backlight module 8. In one embodiment of the present disclosure, when the third panel 7 is a self-luminous display panel, the backlight module 8 shown in FIG. 9 may be omitted.

Figure 10:
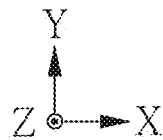
FIG. 10 is a schematic top view of partial first panel in an electronic device according to one embodiment of the present disclosure.
Figure 10:
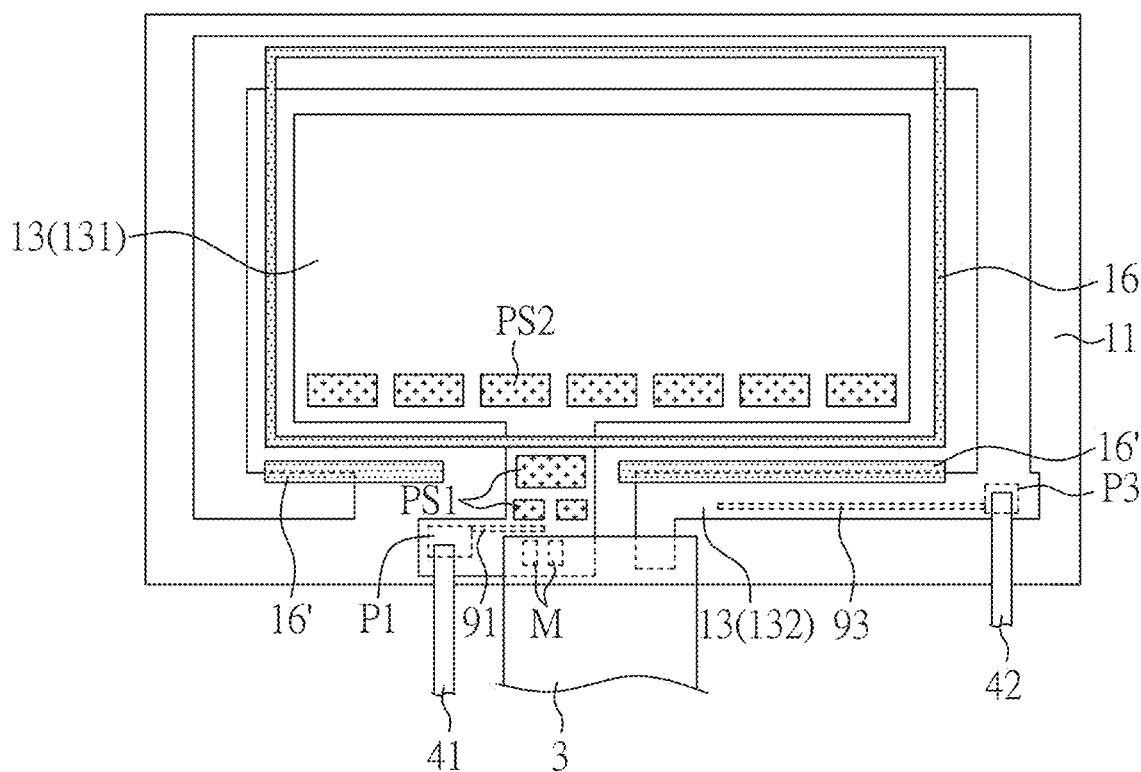

FIG. 10 is a schematic top view of partial first panel in an electronic device according to one embodiment of the present disclosure. For convenience of explanation, some components are omitted in FIG. 10.

In one embodiment of the present disclosure, as shown in FIG. 10, the first panel 1 may comprise a first sealant 16 and an outer sealant 16' respectively disposed between the first conductive layer 13 and the second conductive layer 14 (as shown in FIG. 3B), and the outer sealant 16' is closer to the circuit board 3 or the first bonding pad P1/the third bonding pad P3 than the first sealant 16. In the top view direction Z of the electronic device, part of the outer sealant 16' may be overlapped with the second portion 132 of the first conductive layer 13, and the outer sealant 16' and the third conductive line 93 are not overlapped. In one embodiment of the present disclosure, as shown in FIG. 10, the first panel 1 may comprise a first supporting unit PS1 and a second supporting unit PS2, the first supporting unit PS1 and the second supporting unit PS2 are respectively disposed between the first conductive layer 13 and the second conductive layer 14 (as shown in FIG. 3B), and the first supporting unit PS1 may be disposed outside the first sealant 16, and the second supporting unit PS2 may be disposed inside the first sealant 16. In other words, the first supporting unit PS1 is disposed closer to the circuit board 3 than the second supporting unit PS2. The first supporting unit PS1 and the second supporting unit PS2 can maintain the distance between the first substrate 11 and the second substrate 12 (as shown in FIG. 3B). Thus, the short circuit caused by the collapse of the substrate in the first conductive layer 13 and the second conductive layer 14 (as shown in FIG. 3B) extending outside the first sealant 16 can be reduced, thereby improving the reliability of the electronic device. In one embodiment of the present disclosure, as shown in FIG. 10, in the direction perpendicular to the top view direction Z of the electronic device (for example, the Y direction), part of the first supporting unit PS1 and the second supporting unit PS2 may be partially overlapped, thereby improving the reliability of the electronic device.

The above specific embodiments are to be construed as illustrative only and not in any way limiting of the remainder of the present disclosure.

Although the present disclosure has been explained in relation to its embodiment, it is to be understood that many other possible modifications and variations can be made without departing from the spirit and scope of the disclosure as hereinafter claimed.

The invention claimed is:

1. An electronic device, comprising:
   a first panel comprising a first substrate and a first bonding pad, wherein the first substrate has a first surface, the first surface has a first edge and a second edge oppositely disposed along a first direction, and the first bonding pad is disposed on the first surface of the first substrate and disposed closer to the first edge than the second edge;
   a second panel overlapped with the first panel along a second direction perpendicular to the first direction, wherein the second panel comprises a second substrate and a second bonding pad, the second substrate has a second surface, the second surface has a third edge and a fourth edge oppositely disposed along the first direction, the first edge and the third edge extend along a third direction different from the first direction and the second direction, and the first edge is closer to the third edge than the fourth edge,
   wherein the second bonding pad is disposed on the second surface of the second substrate and disposed closer to the third edge than the fourth edge;
   a circuit board electrically connected to the first bonding pad of the first panel and configured to provide a first signal; and
   a first conductive connector electrically connected to the first bonding pad of the first panel and the second bonding pad of the second panel,
   wherein the first signal is input to the first bonding pad of the first panel through the circuit board, and input to the second bonding pad of the second panel through the first conductive connector,
   wherein in a top view and along the first direction, the first bonding pad is between the second bonding pad and the first edge of the first surface of the first substrate of the first panel.

2. The electronic device of claim 1, wherein the first panel comprises a first conductive layer, and the first bonding pad and the first conductive layer are overlapped; wherein the first conductive connector is electrically connected to the first bonding pad through the first conductive layer.

3. The electronic device of claim 1, further comprising a first polarizer disposed on the second panel, wherein the first polarizer has a concave to exposing a part of the first conductive connector, and the concave is disposed closer to the third edge than the fourth edge.

4. The electronic device of claim 1, further comprising:
   a first polarizer disposed on a first side of the second panel away from the first panel;
   a second polarizer disposed between the first panel and the second panel; and
   a third polarizer disposed on a second side of the first panel away from the second panel, wherein polarizing axes of the first polarizer, the second polarizer and the third polarizer are parallel to each other.

5. The electronic device of claim 1, wherein the first conductive connector and the circuit board are disposed closer to the first edge than the second edge, and the first conductive connector comprises a conductive glue.

6. The electronic device of claim 1, wherein the first panel comprises:
a third substrate disposed opposite to the first substrate;
a first conductive layer disposed on the first substrate;
a second conductive layer disposed on the third substrate; and
a first supporting unit disposed between the first conductive layer and the second conductive layer.

7. The electronic device of claim 6, wherein the first panel further comprises:
a first light modulating layer disposed between the first conductive layer and the second conductive layer; and
a first sealant disposed between the first conductive layer and the second conductive layer and surrounds the first light modulating layer,
wherein the first supporting unit is disposed outside the first sealant.

8. The electronic device of claim 6, wherein the first panel further comprises a second supporting unit disposed between the first conductive layer and the second conductive layer, wherein the first supporting unit and the second supporting unit are partially overlapped in a direction perpendicular to the top view direction of the electronic device.

9. The electronic device of claim 1, wherein the first panel has a first length, the second panel has a second length, and the first length is different from the second length.

10. The electronic device of claim 1, further comprising a third panel, wherein the first panel and the second panel are disposed on the third panel.

11. The electronic device of claim 10, further comprising a backlight module, wherein the third panel is disposed on the backlight module.

12. The electronic device of claim 1, wherein the first panel further comprises:
a third substrate disposed opposite to the first substrate and having a fifth edge,
wherein the second panel further comprising:
a fourth substrate disposed opposite to the second substrate and having a sixth edge,
wherein the first edge, the fifth edge, the second edge and the sixth edge are parallel to each other, and a distance between the first edge and the fifth edge is different from a distance between the second edge and the sixth edge.

13. An electronic device, comprising:
a first panel comprising a first substrate and a first bonding pad, wherein the first substrate has a first surface, the first surface has a first edge and a second edge oppositely disposed along a first direction, and the first bonding pad is disposed on the first surface of the first substrate and disposed closer to the first edge than the second edge;
a second panel overlapped with the first panel along a second direction perpendicular to the first direction, wherein the second panel comprises a second substrate and a second bonding pad, the second substrate has a second surface, the second surface has a third edge and a fourth edge oppositely disposed along the first direction, the first edge and the third edge extend along a third direction different from the first direction and the second direction, and the first edge is closer to the third edge than the fourth edge,
wherein the second bonding pad is disposed on the second surface of the second substrate and disposed closer to the third edge than the fourth edge;
a circuit board electrically connected to the first bonding pad of the first panel and configured to provide a first signal; and
a first conductive connector electrically connected to the first bonding pad of the first panel and the second bonding pad of the second panel,
wherein the first signal is input to the first bonding pad of the first panel through the circuit board, and input to the second bonding pad of the second panel through the first conductive connector,
wherein a resistance of the circuit board is different from a resistance of the first conductive connector.

14. The electronic device of claim 13, wherein the first panel comprises a first conductive layer, the first bonding pad and the first conductive layer are overlapped, and the first conductive connector is electrically connected to the first bonding pad through the first conductive layer.

15. The electronic device of claim 13, further comprising a first polarizer disposed on the second panel, wherein the first polarizer has a concave exposing a part of the first conductive connector, and the concave is disposed closer to the third edge than the fourth edge.

16. The electronic device of claim 13, further comprising:
a first polarizer disposed on a first side of the second panel away from the first panel;
a second polarizer disposed between the first panel and the second panel; and
a third polarizer disposed on a second side of the first panel away from the second panel,
wherein polarizing axes of the first polarizer, the second polarizer and the third polarizer are parallel to each other.

17. The electronic device of claim 13, wherein the first conductive connector and the circuit board are disposed closer to the first edge than the second edge, and the first conductive connector comprises a conductive glue.

18. The electronic device of claim 13, wherein the first panel comprises:
a third substrate disposed opposite to the first substrate;
a first conductive layer disposed on the first substrate;
a second conductive layer disposed on the third substrate; and
a first supporting unit disposed between the first conductive layer and the second conductive layer.

19. The electronic device of claim 1, wherein the first panel further comprises:
a third substrate disposed opposite to the first substrate;
a first conductive layer disposed on the first substrate;
a second conductive layer disposed on the third substrate; and
a first light modulating layer disposed between the first conductive layer and the second conductive layer,
wherein by controlling a voltage of the first conductive layer and a voltage of the second conductive layer, the first panel is configured to be switched between a sharing mode and a privacy mode.

20. The electronic device of claim 19, wherein the second panel further comprising:
a fourth substrate disposed opposite to the second substrate,
a third conductive layer disposed on the second substrate, a fourth conductive layer disposed on the fourth substrate, a second light modulating layer disposed between the third conductive layer and the fourth conductive layer, wherein by controlling a voltage of the third conductive layer and a voltage of the fourth conductive layer, the second panel is configured to be switched between a sharing mode and a privacy mode.

* * * * *